US011258789B2

(12) United States Patent
Itach et al.

(10) Patent No.: US 11,258,789 B2
(45) Date of Patent: Feb. 22, 2022

(54) SYSTEM AND METHOD FOR FINGERPRINT VALIDATION

(71) Applicant: Forcepoint LLC, Austin, TX (US)

(72) Inventors: Gal Itach, Ra'anana (IL); Ayval Ron, Ra'anana (IL)

(73) Assignee: FORCEPOINT LLC, Austin, TX (US)

( * ) Notice: Subject to any disclaimer, the term of this patent is extended or adjusted under 35 U.S.C. 154(b) by 309 days.

(21) Appl. No.: 16/209,097

(22) Filed: Dec. 4, 2018

(65) Prior Publication Data

US 2020/0177585 A1 Jun. 4, 2020

(51) Int. Cl.
| H04L 29/06 | (2006.01) |
| H04L 9/06 | (2006.01) |
| H04L 67/06 | (2022.01) |
| H04L 101/659 | (2022.01) |

(52) U.S. Cl.
CPC ........ *H04L 63/0861* (2013.01); *H04L 9/0643* (2013.01); *H04L 61/6059* (2013.01); *H04L 63/0428* (2013.01); *H04L 67/06* (2013.01); *H04L 63/14* (2013.01)

(58) Field of Classification Search
CPC ............... H04L 63/0861; H04L 9/0643; H04L 61/6059; H04L 63/0428; H04L 67/06; H04L 63/14
See application file for complete search history.

(56) References Cited

U.S. PATENT DOCUMENTS

| 5,555,376 A | 9/1996 | Theimer et al. |
| 7,509,687 B2 | 3/2009 | Ofek et al. |
| 7,590,589 B2 | 9/2009 | Hoffberg |
| 8,181,262 B2 | 5/2012 | Cooper et al. |
| 8,463,184 B2 | 6/2013 | Dua |
| 8,510,566 B1 | 8/2013 | Oprea |
| 8,700,729 B2 | 4/2014 | Dua |
| 2004/0039921 A1 | 2/2004 | Chuang |
| 2004/0199490 A1 | 10/2004 | Peled et al. |
| 2008/0100414 A1 | 5/2008 | Diab et al. |
| 2015/0205964 A1* | 7/2015 | Eytan .................... G06F 21/568 726/23 |

(Continued)

FOREIGN PATENT DOCUMENTS

| CN | 1969524 | 5/2007 |
| CN | 101141416 | 9/2007 |
| WO | 2006062546 | 6/2006 |

OTHER PUBLICATIONS

Hinden, et al., "Network Working Group—Request for Comments: 4291—IP Version 6 Addressing Architecture", Cisco Systems, Feb. 2006, 25 pages.

*Primary Examiner* — Ayoub Alata
(74) *Attorney, Agent, or Firm* — Jackson Walker LLP; Christopher J. Rourk

(57) ABSTRACT

A system for optimization of data transmission, comprising a content protection extraction system configured to operate on a remote processor and to extract content protection data associated with a data file and to transmit the content protection data to a central processor and a content protection confirmation system configured to operate on the central processor and to receive the content protection data and to verify whether the content protection data is associated with an authenticated data file.

18 Claims, 1 Drawing Sheet

(56) References Cited

U.S. PATENT DOCUMENTS

2016/0119375 A1* 4/2016 Kong ................... H04L 63/1416
                                                              726/23
2017/0308367 A1* 10/2017 Clothier .............. G06F 9/44536
2019/0104409 A1* 4/2019 Wu ...................... H04W 64/003

* cited by examiner

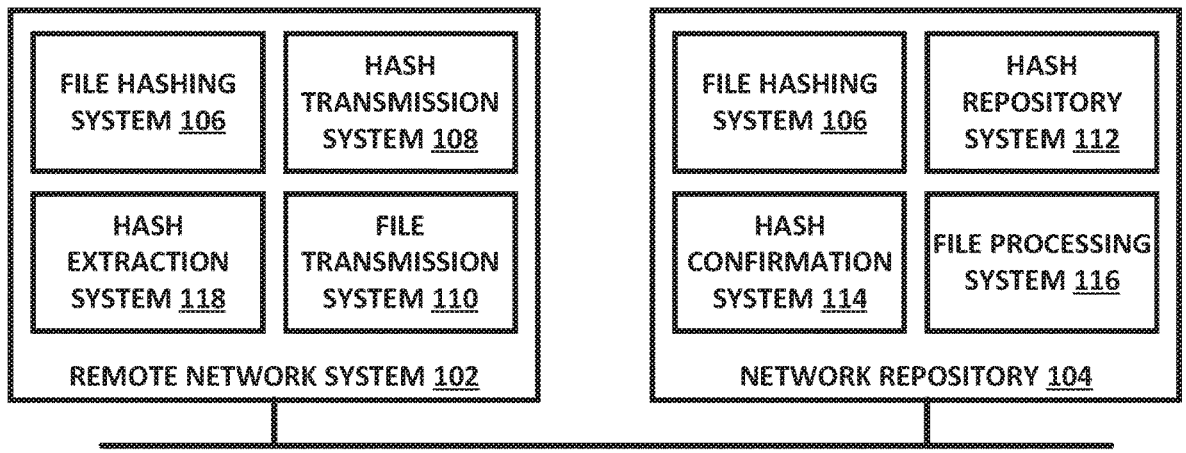
FIGURE 1    100
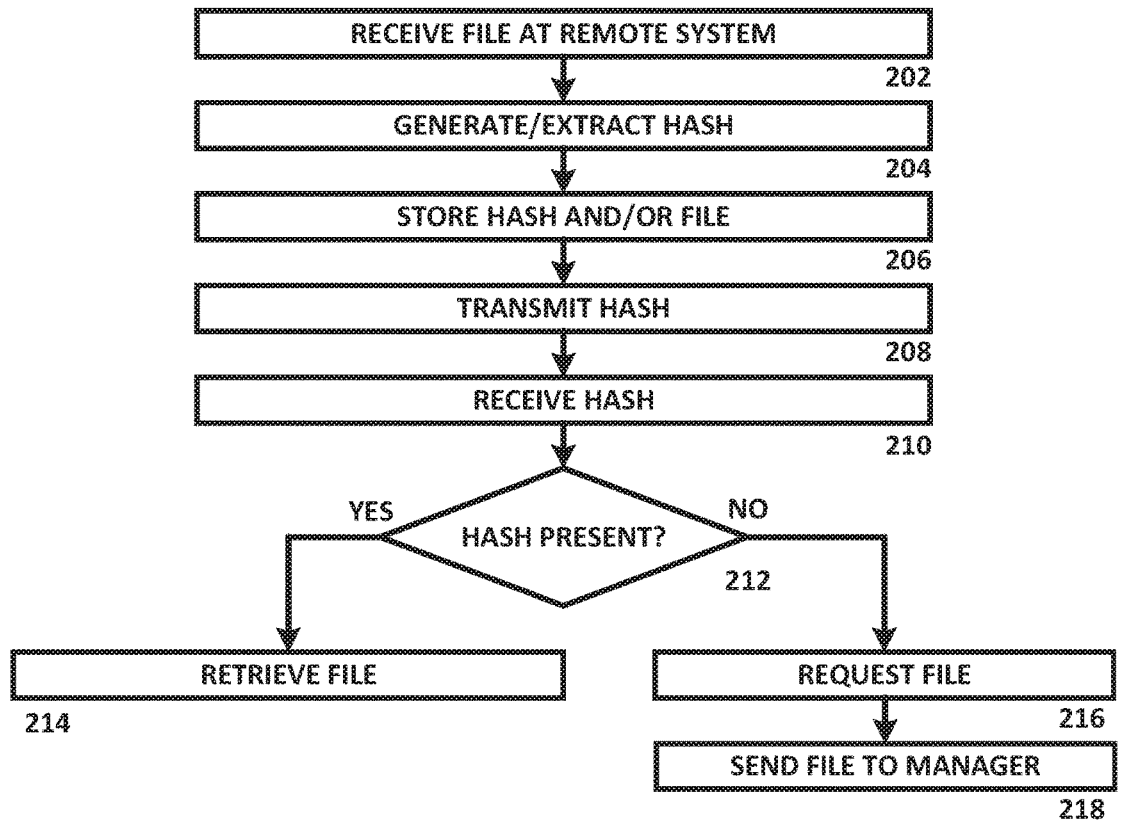
FIGURE 2    200

SYSTEM AND METHOD FOR FINGERPRINT VALIDATION

TECHNICAL FIELD

The present disclosure relates generally to data security, and more specifically to a system and method for fingerprint validation that eliminates the need to transmit a file of data until an associated fingerprint for the file has been authenticated at a central data security server.

BACKGROUND OF THE INVENTION

Data security applications can perform content evaluation on data files, but the overhead associated with transmission of a large data file can be substantial. As a result, resources can be wasted when such large files are transmitted and subsequently rejected for data security reasons.

SUMMARY OF THE INVENTION

A system for optimization of data transmission is disclosed that includes a content protection extraction system that is configured to operate on a remote processor and to extract content protection data associated with a data file and to transmit the content protection data to a central processor. A content protection confirmation system is configured to operate on the central processor, to receive the content protection data and to verify whether the content protection data is associated with an authenticated data file.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which:

FIG. 1 is a diagram of a system for fingerprint validation, in accordance with an example embodiment of the present disclosure; and FIG. 2 is a flow chart of an algorithm for processing a hash or other suitable content protection data, in accordance with an example embodiment of the present disclosure.

DETAILED DESCRIPTION OF THE INVENTION

In the description that follows, like parts are marked throughout the specification and drawings with the same reference numerals. The drawing figures may be to scale and certain components can be shown in generalized or schematic form and identified by commercial designations in the interest of clarity and conciseness.

In prior art content protection systems such as U.S. Pat. No. 9,692,762, which is hereby incorporated by references for all purposes as if set forth herein in its entirety, a file can be transmitted to a central system from an endpoint for content protection processing. For example, once a file transaction has arrived at the central system, such as in an email attachment or in other suitable manners, the system can check to determine whether the file is protected, such as by using a fast proof of non-existence (FPNE) mechanism or in other suitable manners. Because the FPNE mechanism utilizes a probabilistic algorithm that requires extensive processing and verification against a database of known hashes, the file is sent to the central system for generation of a hash and the subsequent verification. However, such authentication techniques and the associated data processing is bandwidth and processor intensive.

After the central system processes the file by generating a hash of the file and checking to see if the hash is present, then the central system can generate an indication that the file is either protected or not protected, and the indication can be returned to the endpoint system, which can either block the file, audit the file, quarantine the file or perform some other action. However, that process requires substantial bandwidth to transmit the file from the endpoint system to the central system, and also requires substantial processing resources at the central system.

The present disclosure uses a network driver that can verify whether a file binary hash is protected or not, without going through all of the networking layers to transmit the entire file. Thus, the present disclosure substantially reduces network congestion by eliminating the need to transmit the associated file unless it is not already present at the endpoint system. The system and method of the present disclosure can use an existing hash that is associated with a file, and can also distribute hash generation to remote network systems, which also substantially reduces processing requirements of the endpoint system, as the endpoint system does not need to generate the hash if it is already present.

The present disclosure utilizes the FPNE mechanism or other suitable content protection mechanisms to determine whether a hash or other associated file content identifier exists. A suspected hash or other content protection data that is present in association with or part of a data file can be transmitted from a remote system to a central server in an IPv6 packet, such as in one or more header fields, payload fields or in other suitable manners. A network driver or other suitable systems at the central server can be configured to receive the IPv6 packet and to verify whether the hash data or other content protection data is correct, and the network driver can return the decision to the remote system. If it is determined that the file has not previously been analyzed for content protection, the file can be forwarded from the remote system to the central server for analysis of the content. Otherwise, the data file does not need to be transmitted from the remote system to the central server.

FIG. 1 is a diagram of a system 100 for fingerprint validation, in accordance with an example embodiment of the present disclosure. System 100 includes remote network system 102, network repository 104, file hashing system 106, hash transmission system 108, hash extraction system 118, file transmission system 110, hash repository system 112, hash confirmation system 114 and file processing system 116, each of which can be implemented in hardware or a suitable combination of hardware and software, and which can be one or more algorithms operating on one or more processors.

Remote network system 102 can be implemented as one or more algorithms that cause one or more processors to perform the function of identifying content protection data for a file and transmitting the content protection data to a remote content management system. The algorithms can be implemented by converting the algorithms from a user-readable source code format to a machine readable object code format, such as by using a compiler that creates machine-readable object code that can be linked into an executable for use with a processor that has a predetermined configuration of buffers, registers, arithmetic logic units, dynamic link libraries and so forth. Remote network system 102 can implemented as a number of discrete subsystems or modules, including but not limited to the subsystems and modules described herein.

Network repository 104 can be implemented as one or more algorithms that cause one or more processors to perform the function of receiving a fingerprint, which generally refers to content protection data for a file (such as a hash of the file that is generated using a confidential algorithm) that can be used to determine whether the file is authentic or trustworthy, and determining whether the content protection data is present in a local repository (because a fingerprint, hash or other content protection can be a smaller data set than the protected content, there is a small risk that different content data sets could have the same fingerprint, hash or other content protection, so additional verification against the entire data set can be used to provide the greatest certainty). If the content protection data is present in the local repository, network repository 104 can use an associated file in the repository instead of requiring the file to be transmitted to network repository 104 from remote network system 102, so as to reduce the amount of bandwidth consumed by the network, the amount of duplicated data in a data storage repository and for other suitable purposes. If the content protection data is not present in the local repository, network repository 104 can request the associated data file, can process the data file to ensure that it is safe to store in the repository and can store the requested file if it is safe, with an association to the content protection data, to allow the content protection data to be detected in subsequent operations.

File hashing system 106 can be implemented as one or more algorithms that cause one or more processors to perform the function of receiving a file and determining whether content protection data is associated with the file, such as in one or more header data fields or in other suitable locations. If it is determined that the content protection data is not present, file hashing system 106 can generate the content protection data, such as by generating a hash of the file contents or in other suitable manners. The content protection data, such as a hash, can be used to uniquely identify the file, and can be generated by an algorithm that can create a significantly different hash or other suitable content protection data if minor data variations are present in the file, to make it easy to determine whether the file has been manipulated.

Hash transmission system 108 can be implemented as one or more algorithms that cause one or more processors to perform the function of transmitting a hash or other suitable content protection data to network repository 104 or other remote systems. In one example embodiment, hash transmission system 108 can insert the hash or other content protection data into one or more predetermined fields of an IPv6 data frame header or payload, so as to allow a driver at the remote system to determine whether the hash or other suitable content protection data has a predetermined format, corresponds to a hash or other suitable content protection data associated with a file in a local repository or for other suitable purposes.

Hash extraction system 118 can be implemented as one or more algorithms that cause one or more processors to perform the function of extracting a hash or other suitable content protection data from a data file. In one example embodiment, the hash or other suitable content protection data can be stored in one more predetermined fields of the file. In another example embodiment, the hash or other suitable content protection data can be generated by processing the data contained in the file, such as to generate a unique hash or content protection data.

File transmission system 110 can be implemented as one or more algorithms that cause one or more processors to perform the function of transmitting a data file associated with a hash or other suitable content protection data in response to a request from a remote network repository 104 or other suitable systems. In one example embodiment, file transmission system 110 can store a transmitted hash or other suitable content protection data in a buffer with a pointer to an associated data file for a predetermined period of time, until a response is received from a remote system or in other suitable manners, and can transmit the associated file if the response includes a request for the file or in other suitable manners.

Hash repository system 112 can be implemented as one or more algorithms that cause one or more processors to perform the function of storing a hash or other suitable content protection data and associated file data, to allow the hashes or content protection data to be searched to locate a matching hash or content protection data. In one example embodiment, the hash or other suitable content protection data can be stored in a manner that facilitates searching, such as in a numerical order.

Hash confirmation system 114 can be implemented as one or more algorithms that cause one or more processors to perform the function of generating a hash or content protection data for a received data file, such as to verify that a previously transmitted hash or other suitable content protection data is associated with the data file. In this example embodiment, hash confirmation system 114 can be used to verify that a number of fields of the hash or content protection data correlates to an expected number of fields, that it contains a predetermined number of data fields that are inserted into the hash or content protection data, to generate a hash or other suitable content protection data from the data file, to verify that the file associated with the hash or other suitable content protection data is one that would generate the hash or other suitable content protection data, or can perform other suitable functions, such as to protect an associated system from receiving a file that has been modified with malicious code or for other suitable purposes.

File processing system 116 can be implemented as one or more algorithms that cause one or more processors to perform the function of processing a received file, such as to store the file in a data repository with an associated hash or other suitable content protection data, to allow the file to be retrieved and used.

FIG. 2 is a flow chart of an algorithm 200 for processing a hash or other suitable content protection data, in accordance with an example embodiment of the present disclosure. Algorithm 200 can be implemented in hardware or a suitable combination of hardware and software, and can include one or more commands operating on one or more processors. While algorithm 200 and other example algorithms disclosed herein can be shown or described in flow chart form, they can also or alternatively be implemented using state machines, object-oriented programming or in other suitable manners.

Algorithm 200 begins at 202, where a file is received at a remote network system. In one example embodiment, the file can be locally stored and attached to an email, and the remote network system can be a workstation that is used in a remote location to allow a user to view the file. The algorithm then proceeds to 204.

At 204, a hash or other suitable content protection data is generated from the file, extracted from the file or otherwise obtained. In one example embodiment, the hash or other suitable content protection data can be stored in a predetermined file location, such as a file header, and can be extracted from that location. In another example embodiment, the hash or other suitable content protection data can be locally generated by performing one or more algorithmic processes on the data file. The algorithm then proceeds to 206.

At 206, the hash, content protection data and/or data file are stored, such as to allow a remote network repository to be contacted with the hash or content protection data, and to allow the file to be transmitted to the remote network repository if requested, where suitable. The algorithm then proceeds to 208.

At 208, the hash or content protection data is transmitted to the remote network repository or other system or device. In one example embodiment, a hash can be sent to determine whether the hash is stored in the remote network repository, such as to verify whether the hash is authentic, to reduce the need to transmit a file if it is already present at the remote network repository or for other suitable purposes. In another example embodiment, the hash or content protection data can be transmitted using a predetermined header or payload data format location in an IPv6 data frame, or in other suitable manners. The algorithm then proceeds to 210.

At 210, the hash or content protection data is received at the remote repository. In one example embodiment, a hash can be received to determine whether the hash is stored in the remote network repository, such as to verify whether the hash is authentic, to reduce the need to transmit a file if it is already present at the remote network repository or for other suitable purposes. In another example embodiment, the hash or content protection data can be received using a predetermined header or payload data format location in an IPv6 data frame, or in other suitable manners. The algorithm then proceeds to 210.

At 212, it is determined whether the hash or content protection data is present in a local repository. In one example embodiment, the hash or content protection data associated with a data file can be stored in a database with a structure that facilitates searching, such as numerical order or the like. If it is determined that the hash or content protection data is present, the algorithm proceeds to 214 where the data file associated with the hash or content protection data is retrieved. In one example, the data file can be retrieved in response to a user request to view the file, such as when an email attachment is opened by the recipient or in other suitable manners. If it is determined that the hash or content protection data is not present, the algorithm proceeds to 216.

At 216, the network repository or other suitable system or device requests the data file from the remote system that is sending the data file. The algorithm then proceeds to 218, where the file is sent to the file manager of the network repository. In one example embodiment, the file manager can generate a hash or content protection data and compare the hash or content protection data with the hash or content protection data that was transmitted by the remote network system, to determine whether the hash or content protection data is authenticated or if it indicates that the hash or content protection data was not properly generated, was spoofed or is otherwise not authenticated.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for optimization of data transmission, comprising: a content protection extraction system configured to operate on a remote processor and to extract content protection data associated with a data file and to transmit the content protection data to a central processor; and a content protection confirmation system configured to operate on the central processor and to receive the content protection data and to verify whether the content protection data is associated with an authenticated data file to verify that the data file has not been modified with malicious code, wherein the content protection extraction system is configured to transmit the content protection data to the central processor in predetermined fields of an IPV6 data frame header, wherein the content protection data comprises a unique hash value.

2. The system of claim 1 wherein the content protection confirmation system is configured to verify whether the content protection data is associated with the authenticated data file by processing a data structure of the content protection data to determine if it is associated with a unique protected data file.

3. The system of claim 1 wherein the content protection confirmation system is configured to verify whether the content protection data is associated with the authenticated data file by determining whether the content protection data is stored in a local data memory.

4. The system of claim 1 wherein the content protection confirmation system is configured to request the data file associated with the content protection data from a repository of unique protected data files if the content protection data is not stored in a local data memory.

5. The system of claim 1 wherein the content protection confirmation system is configured to request the data file associated with the content protection data from a repository of unique protected data files if the content protection data is not stored in a local data memory device and to process the data file to determine whether the data file is infected with malware.

6. The system of claim 1 wherein the content protection confirmation system is configured to request the data file associated with the content protection data if the content protection data is not stored in a local data memory, to determine whether the data file is infected with malware, and to store the data file and the associated content protection data in a local data memory device as a unique protected data file.

7. The system of claim 1 wherein the content protection extraction system is configured to extract the content protection data associated with the data file by generating a hash of the data file that.

8. The system of claim 1 wherein the content protection extraction system is configured to extract the content protection data associated with the data file from a predetermined location in the data file of a unique protected data file.

9. The system of claim 1 wherein the content protection confirmation system is configured to receive the content protection data in a predetermined location of an IPv6 data frame using a network interface device and to verify whether the content protection data is associated with the authenticated data file using the network interface device.

10. A method for optimization of data transmission, comprising:
extracting content protection data associated with a data file; transmitting the content protection data to a central processor, wherein the content protection data associated with the data file is transmitted to the central processor in predetermined fields of an IPV6 data frame header, wherein the content protection data comprises a unique hash value; receiving the content protection data at the central processor; and verifying whether the content protection data is associated with an authenticated data file to verify that the data file has not been modified with malicious code using a fast proof of non-existence process.

11. The method of claim 10 wherein the content protection data associated with the data file is extracted at a remote processor and further comprising verifying whether the content protection data is associated with the authenticated data file by processing a data structure of the content protection data without receiving the data file at the remote processor to determine whether the data structure is associated with a unique protected data file that corresponds to the data file.

12. The method of claim 10 comprising verifying whether the content protection data is associated with the authenticated data file by determining whether the content protection data is stored in a local data memory storing unique protected data files.

13. The method of claim 10 comprising requesting the data file associated with the content protection data if the content protection data is not stored in a local data memory and determining whether the data file is a unique protected data file.

14. The method of claim 10 comprising requesting the data file associated with the content protection data if the content protection data is not stored in a local data memory device and determining whether the data file is protected against malware.

15. The method of claim 10 comprising:
   requesting the data file associated with the content protection data if the content protection data is not stored in a local data memory;
   determining whether the data file is protected against malware; and
   storing the data file as a unique protected data file and the associated content protection data in a local data memory device only if the data file is protected against malware.

16. The method of claim 10 comprising extracting the content protection data associated with the data file by generating a hash of the data file.

17. The method of claim 10 comprising extracting the content protection data associated with the data file from a predetermined location in the data file.

18. The method of claim 10 comprising receiving the content protection data in a predetermined location of an IPv6 data frame using a network interface device and verifying whether the content protection data is associated with the authenticated data file using the network interface device.

* * * * *

UNITED STATES PATENT AND TRADEMARK OFFICE
CERTIFICATE OF CORRECTION

| | | |
|---|---|---|
| PATENT NO. | : 11,258,789 B2 | |
| APPLICATION NO. | : 16/209097 | |
| DATED | : February 22, 2022 | |
| INVENTOR(S) | : Gal Itach et al. | |

It is certified that error appears in the above-identified patent and that said Letters Patent is hereby corrected as shown below:

In the Claims

1. In Column 8, Line 22, in Claim 7, delete "file that." and insert -- file. --, therefor.

Signed and Sealed this
Twenty-second Day of November, 2022

*Katherine Kelly Vidal*

Katherine Kelly Vidal
*Director of the United States Patent and Trademark Office*